E. C. PORTER.
METHOD OF HARVESTING ICE.
APPLICATION FILED JAN. 15, 1915.
1,138,313.
Patented May 4, 1915.
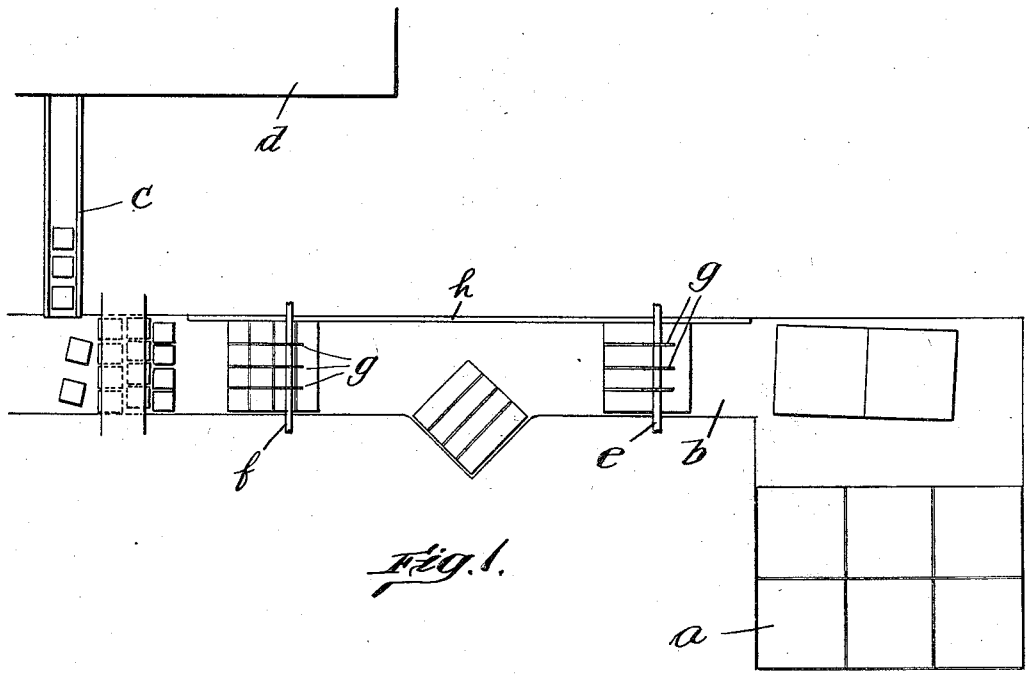
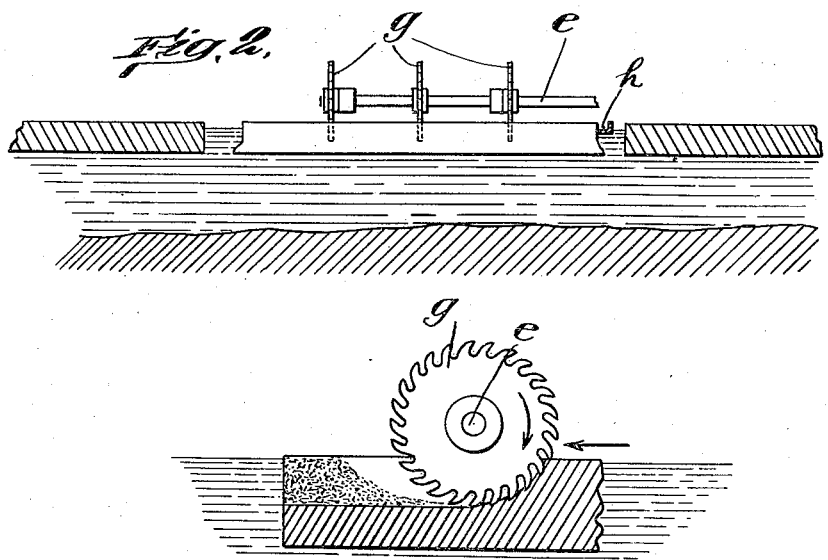
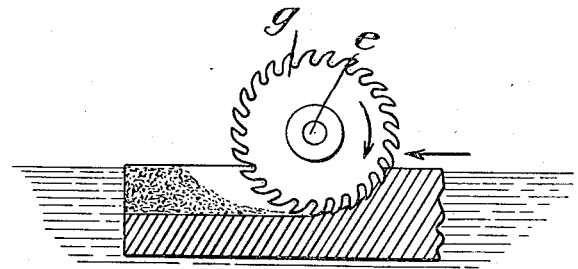

UNITED STATES PATENT OFFICE.

EMMONS C. PORTER, OF BROCKTON, MASSACHUSETTS.

METHOD OF HARVESTING ICE.

1,138,313. Specification of Letters Patent. Patented May 4, 1915.

Original application filed March 1, 1912, Serial No. 680,827. Divided and this application filed January 15, 1915. Serial No. 2,295.

*To all whom it may concern:*

Be it known that I, EMMONS C. PORTER, a citizen of the United States, residing at Brockton, in the county of Plymouth and State of Massachusetts, have invented an Improvement in Methods of Harvesting Ice, of which the following is a specification.

This invention relates to certain improvements in methods of harvesting ice, this application being a division of my application for Letters Patent of the United States filed March 1, 1912, Serial No. 680,827, for ice harvesting apparatus.

In harvesting ice, it has been customary to groove the ice fields with ice plows, or similar appliances, then to cut the fields into large sections, or "floats", which are floated through a channel to the ice-house, and are split, by a hand chisel, into small cakes, just before they are delivered to the conveying chain.

The method of grooving now generally employed is slow and somewhat expensive, and it frequently happens, from various causes, that the grooves become filled with water, which freezes, so that it is impossible to split the sections into regular cakes. This is particularly liable to occur when the sections are floated a considerable distance in very cold weather, as the water is likely to flow into the grooves and then freeze before the section is split. Furthermore, in case of a rain, or thaw, after the field has been grooved, so that the grooves become filled with water, and this is followed by freezing weather, so that the water freezes in its grooves, it frequently happens that the fields cannot be even re-grooved, so that a large field of ice is lost, or cannot be harvested. Also, in seasons where there is a "short crop", the ice is frequently unsafe for horses, so that horse-drawn plows cannot be used.

Various forms of apparatus have been devised for grooving ice fields which comprise a vehicle having circular saws mounted thereon, but if practical devices of this sort were produced, they would not overcome the difficulty above noted, where it is necessary to float the sections long distances.

The object of my invention is to provide a method of harvesting ice which will obviate the difficulties above referred to, and which will, to a large extent, reduce the amount of grooving necessary in the ice-fields, and enable the use of a stationary power plant for this purpose, so that the whole operation may be greatly facilitated, and the expense thereof be reduced.

I accomplish this object, primarily, by grooving the ice in the ice-field to a sufficient extent only to permit it to be separated into large sections, which may be conducted through the usual channel from the field to the ice-house, to a point adjacent the latter, and then forming grooves in each ice-section, as it is thus being floated to the ice-house, by passing the same beneath circular saws or cutters, which are mounted above the level of the water, and dip therein, to a desired extent. I further facilitate the cutting and feeding operation by arranging and operating said saws, so that they will act to create a current in the water, in the direction in which the ice is to be moved, so that the propulsion of the sections to the saws will be assisted, and the saws will cut to better advantage than if they were otherwise operated, and will have at the same time, a feeding action through the resistance required to remove the chips. In further carrying out the process, I, in like manner, form a second set of grooves in each section, at right angles to the grooves first formed, after which, the sections are split into small cakes on the lines of said grooves, and delivered to the ice-elevator.

In carrying out my process, certain apparatus is employed the general character of which is indicated in the accompanying drawings, in which:—

Figure 1 is a diagrammatical view showing the general mode of carrying out the method, and, Figs. 2 and 3 are side and end views of mechanism which is preferably employed.

Fig. 1 of the drawing illustrates, in a general way, an ice-harvesting plant in which *a* indicates the ice-field on the body of the water, and *b* a channel leading from the ice-field to the foot of the ice-elevator *c* of the storage house *d*.

In carrying out my process, the ice-field is merely grooved in large squares, or rectangles, of a size such that they may be subsequently divided into a large number of small cakes, of a size adapted for storage. The ice is then separated into sections on the lines of these grooves, and conducted into the channel. A pair of shafts e and f are mounted in horizontal position over the channel b, and in positions at right angles thereto, in proximity to the storage house, a suitable space being provided therebetween. A gang of circular saws g are mounted on said shafts in uniformly spaced relation, the corresponding end saw of each gang being arranged at a distance from an edge-guide h at the side of the channel which is equal to the distance between each saw. The particular number of saws to be employed and the particular distance which they are arranged, one from the other, depends on circumstances, and is largely a matter of choice. That is, it depends on the required dimensions of the cakes to be stored, and the size of the sections to be taken from the ice field. For example, if a section is square, and is to be divided into sixteen square cakes, three saws will be provided on each shaft, the spaces between which will be equal. Variations from this arrangement for different conditions will be obvious. Said shafts are, further, so positioned, that the lower portions of the saws dip into the body of water to an extent corresponding to the depth of groove to be cut, and the saws are so arranged on the shafts that the teeth, on the lower portions thereof, point in the direction in which the ice is moved as it passes through the channel to the ice house. A suitable source of power is provided which is adapted to rotate the saws forward, or in the direction in which their teeth point, as indicated by the arrow in Fig. 3. When thus operated in the normally still water of the usual ice pond, it will be apparent that the saws will have an action to throw or force the water in the direction in which their lower portions are moving, in the present instance, in the direction of the channel toward the storage house, thereby causing a current of more or less force to flow in the channel, in the direction in which the ice sections are floated therethrough. The strength of this current will vary greatly, according to circumstances, from an almost negligible quantity, to a considerable force, depending largely on the opportunity for return flow, and the length of time which the saws are permitted to rotate in the water between sections. However, under ordinary conditions, if the saws are rotated free in the water, as soon as an ice section is moved into proximity to the saws, a current will have been created, which will have a propelling action on the section, sufficient to assist the workman, to an extent, in pushing the section into engagement with the saws. As soon as an ice-section is in proximity to the first gang of saws, it will be pressed against the edge-guide h, while it is floated along into engagement with the saws. As soon as the saws engage the ice-section, they will begin to cut corresponding grooves in the upper surface thereof, to a depth corresponding to the extent to which the saws dip in the water, and, as the action of the teeth of the saws on the ice is rearward, or in the direction in which the ice is being floated, as well as downward, the resistance to the force required to remove the chips acts to draw the section along, so that the saws feed the ice to themselves as fast as they cut grooves therein, thereby having a combined feeding and cutting action, the entire action being automatic. As a result, a series of parallel grooves, corresponding to the number of saws, will be cut in the surface of the ice-section, as it passes beneath the first set of saws.

In practice, a V-shaped recess is cut in one side of the channel between the two saw shafts of a size sufficient to permit the section to be given a quarter of a turn therein, and when this has been done, the section is again held against the edge-gage and floated under the second set of saws, which, operating in like manner to the first set, form a parallel set of grooves in the surface of the ice-section at right angles to the grooves first formed. The ice-section is then split, usually by hand, into small cakes, on the line of all of its grooves, after which, they are delivered to the ice-elevator.

I claim:—

1. The method of grooving the upper portion of a body of ice, consisting in moving the body of ice in a predetermined path through a body of water, beneath a circular cutter, while rotated about a horizontal axis, disposed above the surface of the water, at right angles to said path, with its lower portion dipping into the water.

2. The method of grooving the upper portion of a body of ice, consisting in causing the body of ice to float in a predetermined path through a body of water, beneath a circular cutter, while rotated about a horizontal axis, disposed at right angles to said path, with its lower portion dipping into the body of water.

3. The method of grooving ice which consists in forwardly rotating a circular cutter about a horizontally disposed axis over a body of water, with its lower portion dipping therein and moving in a predetermined direction, and moving a body of ice in the water, in said direction, beneath the cutter and into engagement with its lower portion, so that the cutter has a combined feeding and grooving action.

4. The method of grooving ice, which consists in forwardly rotating a circular cutter about a horizontally disposed axis over a body of water with its lower portion dipping therein and moving in a predetermined direction, and moving a body of ice, while floating therein, in said direction, and beneath the cutter into engagement with its lower portion, so that the cutter automatically feeds and grooves the ice.

5. The method of harvesting ice, which consists in floating a body of ice in a body of water toward a point of delivery, and in a predetermined path, beneath a gang of suitably spaced circular cutters, rotating about an axis disposed horizontally, and at right angles to said path, at a distance above the surface of the water, so that the lower portions of the cutters dip into the water at predetermined points in said path, and move in the direction of movement of the ice.

6. The method of grooving a rectangular shaped ice section, preparatory to separating it into small cakes, which consists in floating the section in a predetermined path through a body of water beneath a gang of circular cutters, mounted to rotate about an axis disposed horizontally above the surface of the water, at a right angle to said path, so that the lower portions of the cutters dip into the water, to form one set of parallel grooves in the upper portion of the section, then passing the section beneath a second set of similarly arranged cutters, in a position relative thereto at right angles to the position in which it was passed beneath the first set, to form a second set of grooves at right angles to those first formed.

7. The method of harvesting natural ice, which consists in separating an ice body from the ice field, moving said body, while supported in the water, in a predetermined path, beneath the centers of a series of cutters, rotating in parallel planes, and in spaced relation, in position to cut a series of correspondingly disposed incisions in the ice body from the upper side thereof, and as the body is moved past the same.

8. The method of harvesting natural ice, which consists in separating an ice body from the ice field, moving said body in a predetermined path, while supported in the water, beneath a series of cutters stationarily supported above and depending into the water in spaced relation, to form a correspondingly disposed series of parallel grooves in the upper side of said body, extending in the direction of said path.

In testimony whereof, I have signed my name to this specification in the presence of two subscribing witnesses.

EMMONS C. PORTER.

Witnesses:
WM. M. ADAMS,
LEONARD H. PORTER.